(12) United States Patent
Nakae et al.

(10) Patent No.: US 8,233,469 B2
(45) Date of Patent: Jul. 31, 2012

(54) RELAY DEVICE

(75) Inventors: Hironori Nakae, Osaka (JP); Yoshitaka Ohta, Osaka (JP); Yosuke Ukita, Osaka (JP)

(73) Assignee: Panasonic Corporation, Osaka (JP)

( * ) Notice: Subject to any disclaimer, the term of this patent is extended or adjusted under 35 U.S.C. 154(b) by 890 days.

(21) Appl. No.: 11/885,412

(22) PCT Filed: Mar. 8, 2006

(86) PCT No.: PCT/JP2006/304504
§ 371 (c)(1),
(2), (4) Date: Aug. 31, 2007

(87) PCT Pub. No.: WO2006/095787
PCT Pub. Date: Sep. 14, 2006

(65) Prior Publication Data
US 2009/0238108 A1    Sep. 24, 2009

(30) Foreign Application Priority Data
Mar. 10, 2005  (JP) ................................. 2005-066937

(51) Int. Cl.
*H04J 3/24* (2006.01)
(52) U.S. Cl. ..................... 370/349; 370/310.2; 370/315; 370/322; 370/338; 370/346; 370/348
(58) Field of Classification Search ........................ None
See application file for complete search history.

(56) References Cited

U.S. PATENT DOCUMENTS

| | | | |
|---|---|---|---|
| 2003/0093526 A1* | 5/2003 | Nandagopalan et al. ..... 709/225 |
| 2004/0063458 A1 | 4/2004 | Hori | |
| 2004/0264504 A1* | 12/2004 | Jin | .................. 370/469 |
| 2005/0053015 A1* | 3/2005 | Jin et al. | ........................ 370/254 |
| 2005/0094588 A1* | 5/2005 | Wentink | ......................... 370/315 |
| 2006/0041596 A1* | 2/2006 | Stirbu et al. | .................... 707/200 |
| 2006/0146764 A1* | 7/2006 | Takemoto et al. | ............ 370/338 |
| 2006/0165036 A1* | 7/2006 | Chandra et al. | ............... 370/329 |

FOREIGN PATENT DOCUMENTS

| | | |
|---|---|---|
| JP | 10-145424 | 5/1998 |
| JP | 2004-128785 | 4/2004 |
| JP | 2004-147159 | 5/2004 |
| JP | 2005-20705 | 1/2005 |
| WO | WO 2004047376 | * 3/2004 |
| WO | 2004/047376 | 6/2004 |

OTHER PUBLICATIONS

IEEE Standard for Information Technology, "Amendment 7: Medium Access Control (MAC) Quality of Service (QoS) Enhancements", Oct. 2004.

* cited by examiner

*Primary Examiner* — Jae Y Lee
(74) *Attorney, Agent, or Firm* — Wenderoth, Lind & Ponack, L.L.P.

(57) ABSTRACT

A relay device receives transfer data from a transfer-source terminal and transfers the received transfer data to a transfer-destination terminal via relaying performed by another relay device. When the transfer data is received, the relay device establishes a direct communication with the other relay device, if information regarding the other relay device is attached to the received transfer data. If information regarding the other relay device is not attached, then the relay device attaches information regarding itself to the transfer data and transfers the resulting transfer data to a wireless control station.

9 Claims, 8 Drawing Sheets

RELAY DEVICE

TECHNICAL FIELD

The present invention relates to a relay device that relays data between terminals which perform transmission and reception of data such as a content, and that performs wireless communication under the control of a wireless control station, and in particular to technology for stably performing data transmission and reception.

BACKGROUND ART

In order to stably transfer audio, video, and other such data that requires real-time performance, a terminal that transmits such data ensures a sufficient amount of bandwidth before beginning a data transfer.

Patent document 1 discloses technology for ensuring bandwidth between a transfer-source terminal that transmits data and a transfer-destination terminal that is to receive the data, by transferring a packet for setting bandwidth to each relay device, in order, on the communication channel between the transfer-source and transfer-destination terminals.

Also, the IEEE 802.11e standard defines technology for realizing QoS control in a wireless communication system composed of a wireless control station that performs polling control and wireless slave devices that perform wireless communication in accordance with the polling control of the wireless control station (see non-patent document 1). The IEEE 802.11e standard defines a QoS control method that uses the HCCA (Hybrid Coordination Function Controlled Channel Access) control scheme. In HCCA, a wireless slave device can establish direct communication with another wireless slave device by communicating with the other wireless slave device using a predetermined protocol in accordance with transmission control performed by the wireless control station. This enables data to be transferred more efficiently than when the data passes through the wireless control station.

Patent document 1: Japanese Patent Registration No. 2995676

Non-patent document 1: IEEE P802.11e/D11.0, "IEEE Standard for Information Technology—Telecommunications and information exchange between systems—Local and metropolitan area networks Specific requirements—Part 11: Wireless Medium Access Control (MAC) and Physical Layer (PHY) specifications: Amendment 7: Medium Access control (MAC) Quality of Service (QoS) Enhancements", October, 2004

DISCLOSURE OF THE INVENTION

Problems Solved by the Invention

As shown in FIG. 10, there are cases in which a wireless control station or wireless slave device compliant with the aforementioned IEEE 802.11e standard exists as a wireless LAN bridge between terminals. A bridge is a packet transfer device that operates at the data link layer of the OSI Reference Model. Also, a bridge selectively, with respect to the data link layer, relays packets being transmitted and received between different networks. Each time a packet sent by one of the terminals is received from a wireless slave device, the wireless control station that is functioning as a wireless LAN bridge stores the transmission-source MAC address of the received packet in correspondence with the wireless slave that sent the packet, and controls packet transfers to wireless slave devices based on the managed information.

A transfer-source terminal that is to transmit data to a terminal on another network acquires in advance and manages information such as the MAC address of the wireless slave device to which the transfer-source terminal is connected and the IP address of the transfer-destination terminal to which the data is to be transmitted. However, given that the wireless control station operating as a wireless LAN bridge controls transfers of data to wireless slave devices based on the managed MAC addresses, the transfer-source terminal does not manage information including the MAC address of the wireless slave device connected to the transfer-destination terminal.

Consequently, even if the wireless slave device connected to the transfer-source terminal tries to establish direct communication with the wireless slave device connected to the transfer-destination terminal in order to efficiently transmit the data, the former wireless slave device does not know the MAC address of the latter wireless slave device, and therefore cannot establish direct communication.

Also, although a wireless slave device that has received a transfer packet from a wireless control station can acquire the MAC addresses of the transfer-source terminal and the wireless control station by referencing the frame header included in the received packet, the wireless slave device cannot acquire the MAC address of the wireless slave device connected to the transfer-source terminal, and therefore direct communication cannot be established between the wireless slave devices.

In view of this, an aim of the present invention is to provide technology that, even in a case in which a wireless control station and relay devices, which are wireless slave devices, exist as a wireless LAN bridge between a transfer-source terminal and a transfer-destination terminal, enables direct communication between the relay devices and ensuring sufficient bandwidth between terminals without performing a special procedure with respect to the wireless control station.

Means to Solve the Problems

In order to solve the above problem, the present invention is a relay device that controls wireless communication of data in accordance with polling control performed by a wireless control station, and receives transfer data from a transfer-source terminal and transfers the received transfer data to a transfer-destination terminal via relaying by another relay device, the relay device including: a communication unit operable to establish direct communication with the another relay device with use of transfer-source information indicating the another relay device; a detection unit operable to detect that data received via the wireless control station includes the transfer-source information indicating the another relay device which transferred the data to the wireless control station; and a control unit operable to, when the detection unit has performed the detection, control the communication unit to establish direct communication with the another relay device indicated by the transfer-source information.

In the aforementioned structure, the transmission-source information is assumed to be attached to the transfer data by, for example, the transfer-source terminal or the relay device that transferred the data to the wireless control station.

Effects of the Invention

Upon detecting information pertaining to the other relay device that transferred the transfer data to the wireless control station, the relay device having the above structure establishes direct communication with the other relay device, with use of the detected information.

This enables direct communication to be established by the relay devices without performing any sort of special procedure on the wireless control station, and enables AV data etc. that requires real-time performance to be transferred more stably than in conventional technology.

Also, the relay device may further include: an attachment unit operable to attach device information indicating the relay device, to the transfer data which is to be transferred to the wireless control station; and a transfer unit operable to transfer the transfer data attached with the device information to the wireless control station.

This enables direct communication between the relay devices to be established by the relay devices.

Also, the wireless control station and the relay device may perform QoS control in accordance with IEEE 802.11e standard, and the communication unit may establish direct communication with use of Direct Link Setup defined in the IEEE 802.11e standard.

This enables QoS settings to be performed and data to be stably transmitted and received in a wireless communication system composed of a wireless control station and relay devices.

Also, the transfer data transferred by the relay device may be a bandwidth setting packet that is transmitted and received in order for the transfer-source terminal and the transfer-destination terminal to ensure bandwidth, and the relay device may set a bandwidth for communication with the another relay device according to the bandwidth setting packet.

This enables data to be stably transmitted and received between the transfer-source terminal and the transfer-destination terminal after having ensured a sufficient bandwidth for communication.

Also, the bandwidth setting packet may be a packet in accordance with a protocol defined by UPnP AV standard.

Using an existing UPnP AV protocol enables lightening the load on the network.

Also, the present invention is a communication system composed of a first relay device and a second relay device that each control wireless communication of data in accordance with polling control performed by a wireless control station, and receive transfer data from a transfer-source terminal and transfer the received transfer data to a transfer-destination terminal via relaying by another relay device, the first relay device including: an attachment unit operable to attach device information indicating the first relay device, to the transfer data which is to be transferred to the wireless control station; and a transfer unit operable to transfer the transfer data attached with the device information to the wireless control station, and the second relay device including: a communication unit operable to establish direct communication with the another relay device with use of transfer-source information indicating the another relay device; a detection unit operable to detect that data received via the wireless control station includes the transfer-source information indicating the another relay device which transferred the data to the wireless control station; and a control unit operable to, when the detection unit has performed the detection, control the communication unit to establish direct communication with the another relay device indicated by the transfer-source information.

Also, the present invention is a communication control method used in a relay device that controls wireless communication of data in accordance with polling control performed by a wireless control station, and receives transfer data from a transfer-source terminal and transfers the received transfer data to a transfer-destination terminal via relaying by another relay device, including the steps of: establishing direct communication with the another relay device with use of transfer-source information indicating the another relay device; detecting that data received via the wireless control station includes the transfer-source information indicating the another relay device which transferred the data to the wireless control station; and when the detection has been performed in the detecting step, causing establishment of the direct communication with the another relay device indicated by the transfer-source information.

Also, the present invention is an integrated circuit used in a relay device that controls wireless communication of data in accordance with polling control performed by a wireless control station, and receives transfer data from a transfer-source terminal and transfers the received transfer data to a transfer-destination terminal via relaying by another relay device, the integrated circuit including: a communication unit operable to establish direct communication with the another relay device with use of transfer-source information indicating the another relay device; a detection unit operable to detect that data received via the wireless control station includes the transfer-source information indicating the another relay device which transferred the data to the wireless control station; and a control unit operable to, when the detection unit has performed the detection, control the communication unit to establish direct communication with the another relay device indicated by the transfer-source information.

Also, the present invention is a communication control program used in a relay device that controls wireless communication of data in accordance with polling control performed by a wireless control station, and receives transfer data from a transfer-source terminal and transfers the received transfer data to a transfer-destination terminal via relaying by another relay device, including the steps of: establishing direct communication with the another relay device with use of transfer-source information indicating the another relay device; detecting that data received via the wireless control station includes the transfer-source information indicating the another relay device which transferred the data to the wireless control station; and when the detection has been performed in the detecting step, causing establishment of the direct communication with the another relay device indicated by the transfer-source information.

Figure 1:
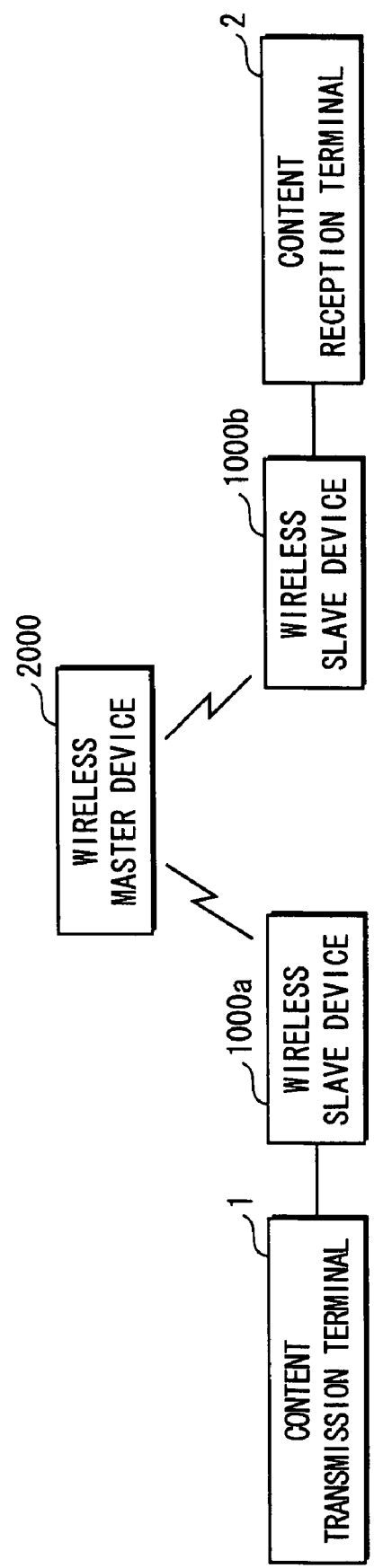
FIG. 1 shows an outline of a wireless communication system of the present invention.

DESCRIPTION OF THE CHARACTERS 101 wired network adapter
102 wireless network adapter
103 packet identification unit
104 packet processing unit
105 device information attachment unit
106 communication control unit
107 bandwidth setting unit
108 Direct Link management information creation unit
109 Direct Link setting management unit
151 wireless master device information acquisition subunit
152 device information acquisition subunit
153 HCCA link identifier acquisition subunit
154 wireless master device information attachment subunit
155 device information attachment subunit
156 HCCA link identifier attachment subunit
161 wireless master device information extraction subunit
162 device information extraction subunit
163 HCCA link identifier extraction subunit
164 wireless master device information acquisition subunit
165 wireless master device information judgment subunit
166 bandwidth setting information creation subunit
167 bandwidth setting identification subunit
171 DLS test reception subunit
172 HCCA link change/break reception subunit
173 11e MAC frame reception subunit
174 DLS test transmission subunit
175 HCCA link change/break transmission subunit
176 11e MAC frame transmission subunit
177 bandwidth setting control subunit

BEST MODE FOR CARRYING OUT THE INVENTION

Embodiment

An embodiment of a relay device pertaining to the present invention is described below with reference to the drawings.

Overview

The relay device of the present invention refers to each wireless slave device in a case in which, as shown in FIG. 1, a wireless master device 2000, which is a wireless control station, and a plurality of wireless slave devices 1000 (1000a and 1000b) exist as bridges between a content transmission terminal 1, which is a transfer-source terminal, and a content reception terminal 2, which is a transfer-destination terminal. The following specifically describes the wireless slave devices. Also, the wireless control device is referred to as the wireless master device in the description thereof.

Also, in the description of the present embodiment, the content transmission terminal 1 is assumed to, before beginning to transmit data to the content reception terminal 2, cause the relay devices on the communication channel therebetween to ensure a sufficient amount of bandwidth. The content transmission terminal 1 is assumed to use the technology described in the aforementioned patent document 1 in order to cause the relay devices to ensure sufficient bandwidth. Specifically, the content transmission terminal 1 transmits a bandwidth setting packet for performing bandwidth setting to the content reception terminal 2 before beginning the data transmission. The bandwidth setting packet is, for example, a packet according to a protocol specified in the UPnP AV standard, or according to ST2 (Internet Stream Protocol Version 2) or RSVP (Resource reservation Protocol) that are specified by the IETF (Internet Engineering Task Force).

Also, the following description focuses on a case in which the wireless slave devices establish direction communication for ensuring bandwidth after the content transmission terminal 1 transmits a bandwidth setting packet, and thereafter.

Note that the network between the content transmission terminal 1 and the wireless slave device 1000a is assumed to be a network in which bandwidth ensuring is not performed (e.g., a cable LAN environment that has a bandwidth of 100 Mbps). The network between the content reception terminal 2 and the wireless slave device 1000b is assumed to be a similar network in which bandwidth ensuring is not performed.

Also, in the specific exemplary embodiment of the present invention, the content transmission terminal 1 is, for example, a content storage server that is storing content, and the content reception terminal 2 is, for example, a PC (Personal Computer) in the possession of a user. The wireless slave devices 1000a and 1000b are wireless LAN adapters or the like, which are connected to the respective terminals. The wireless master device 2000 is a wireless bridge connected to the wireless slave devices 1000a and 1000b.

The following describes a wireless communication system which is composed of a wireless control station that performs polling control and a plurality of wireless slave devices that perform wireless communication in accordance with the polling control. The wireless communication system performs QoS control in accordance with the HCCA (Hybrid Coordination Function Controlled Channel Access) control scheme defined in the IEEE 802.11e standard.

In the wireless communication system, an HC (Hybrid Controller) in the wireless control station collectively manages the allocation of transmission periods to the wireless slave devices. For each instance of data transmission, the wireless slave devices request the allocation of a transmission period by transmitting, to the wireless control station, information regarding a transmission condition required for the data transmission.

The transmission condition regarding data to be transmitted is expressed quantitatively by a parameter group called a TSPEC (Traffic SPECification). Note that the main TSPEC parameters are a Nominal MSDU Size that indicates an average frame size value, a Mean Data Rate that indicates an average data rate value, and the like. A specific description of TSPEC has been omitted since details thereof are defined in the IEEE 802.11e standard.

Figure 8:
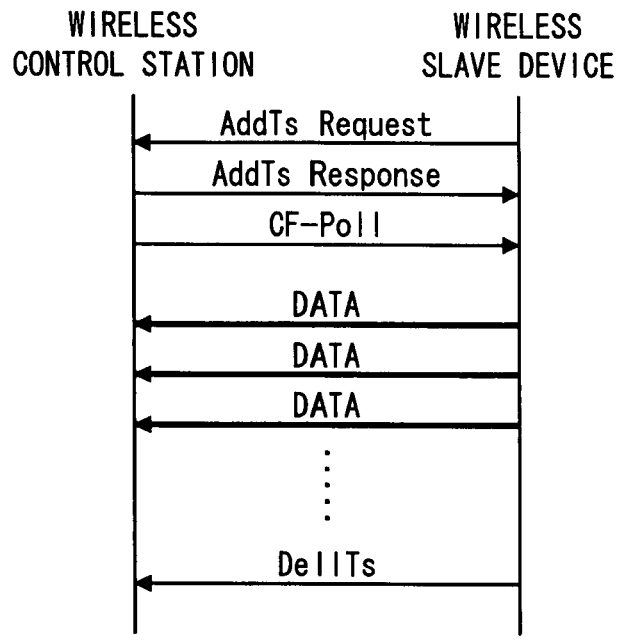
FIG. 8 shows details of communication in a case in which a wireless slave device transmits a bandwidth allocation request to a wireless control station and performs communication with the wireless control station, in accordance with the HCCA control scheme.

The following is a specific description of a case in which a wireless slave device requests bandwidth allocation from the wireless control station and performs communication with the wireless control station. As shown in FIG. 8, the wireless slave device, which is to transmit data, first makes a bandwidth reservation request for a data transmission, by transmitting an AddTs Request to the wireless control station. In this case, given that data is to be transmitted from the wireless slave device to the wireless control station, the wireless slave device transmits the AddTs Request so as to set up an Up Link indicating that data is to be transmitted from the wireless device to the wireless control station. Note that if data is also transmitted from the wireless control station to the wireless slave device, an AddTs Request is transmitted so as to set up a Down Link.

Upon receiving the AddTs Request, the wireless control station judges whether the bandwidth requested by the wireless slave device can be used, and transmits a result of the judgment to the wireless slave device as an AddTs Response. After ensuring the bandwidth, the wireless control station transmits a CF-Poll, which is a polling frame, thereby permitting the wireless slave device to perform transmission.

Upon receiving the CF-Poll, the wireless slave device transmits data to the wireless control station during the allocated period. When the data transmission has ended, the wireless slave device transmits a DellTs to the wireless control station to free up the ensured bandwidth.

Figure 9:
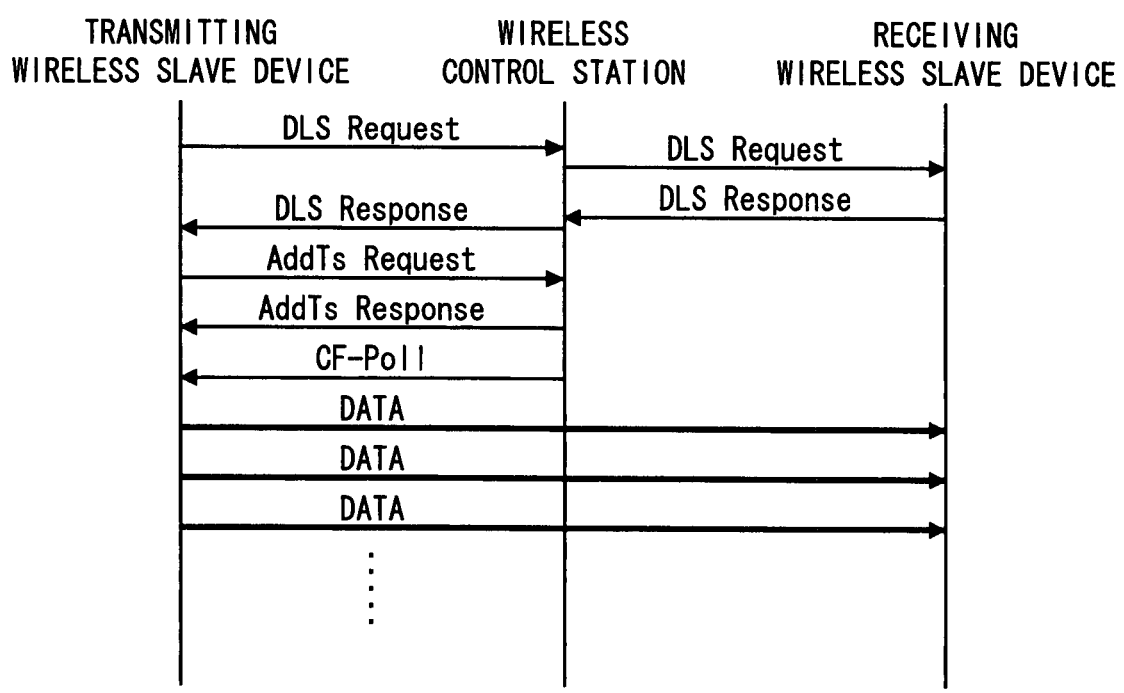
FIG. 9 shows details of communication performed when the wireless slave device establishes direct communication with another wireless slave device in the same BSS in accordance with the HCCA control scheme.
Figure 10:
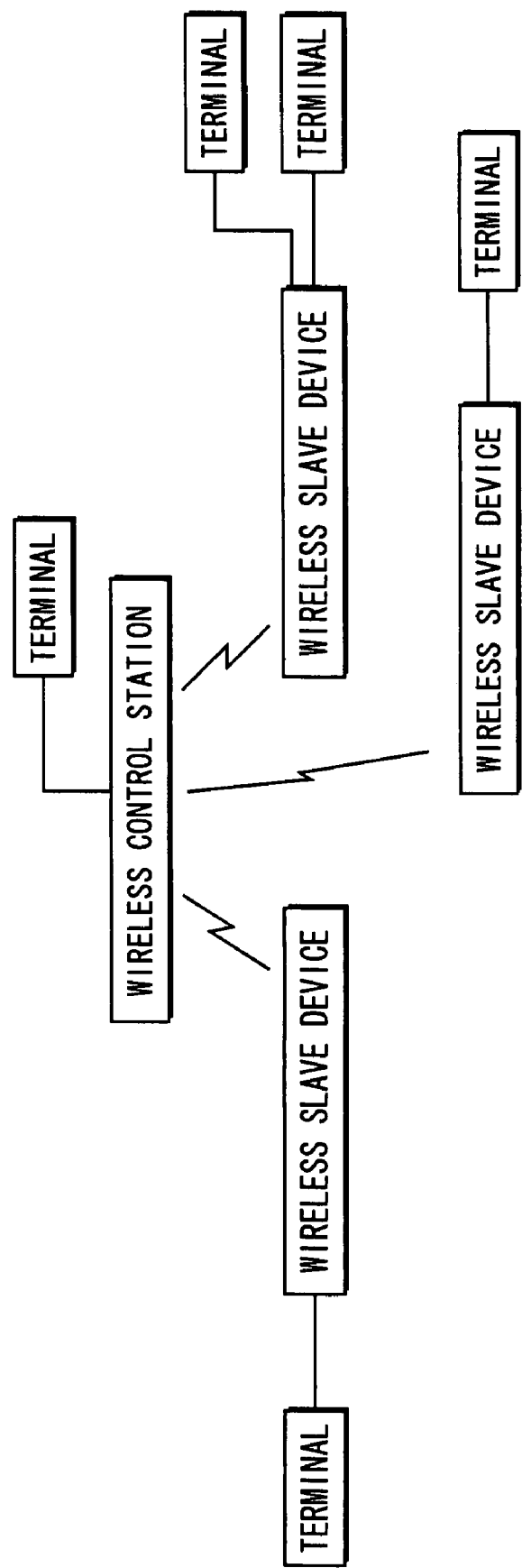
FIG. 10 shows an outline of a communication system in a case in which a wireless communication system compliant with the IEEE 802.11e standard exists as a bridge between terminals.

Also, in the wireless communication system, the wireless slave device can perform direct communication with another wireless slave device in the same BSS (Basic Service Set). The following describes a method by which a wireless slave device that is to transmit data establishes direct communication with a wireless slave device that is to receive the data, referring to FIG. 9.

First, the transmitting wireless slave device transmits a DLS (Direct Link Setup) Request to the receiving wireless slave device via the wireless control station in order to judge whether the receiving wireless slave device supports direct communication with other wireless slave devices.

Upon receiving the DLS Request, the receiving wireless slave device judges whether it can perform direct communication with other wireless slave devices, and transmits a DLS Response including a result of the judgment to the transmitting wireless slave device via the wireless control station. Here, the receiving wireless slave device is assumed to support direction communication with other wireless slave devices.

Upon receiving the DLS Response, the transmitting wireless slave device ensures sufficient bandwidth by transmitting an AddTs Request to the wireless control station. Here, the AddTs Request is for setting a Direct Link since data is to be transmitted by direct communication between wireless slave devices. Upon receiving an AddTs Response and being allocated bandwidth by the wireless control station, the transmitting wireless slave device receives a CF-Poll from the wireless control station, and thereafter begins direct communication with the receiving wireless slave device.

Structure

Figure 2:
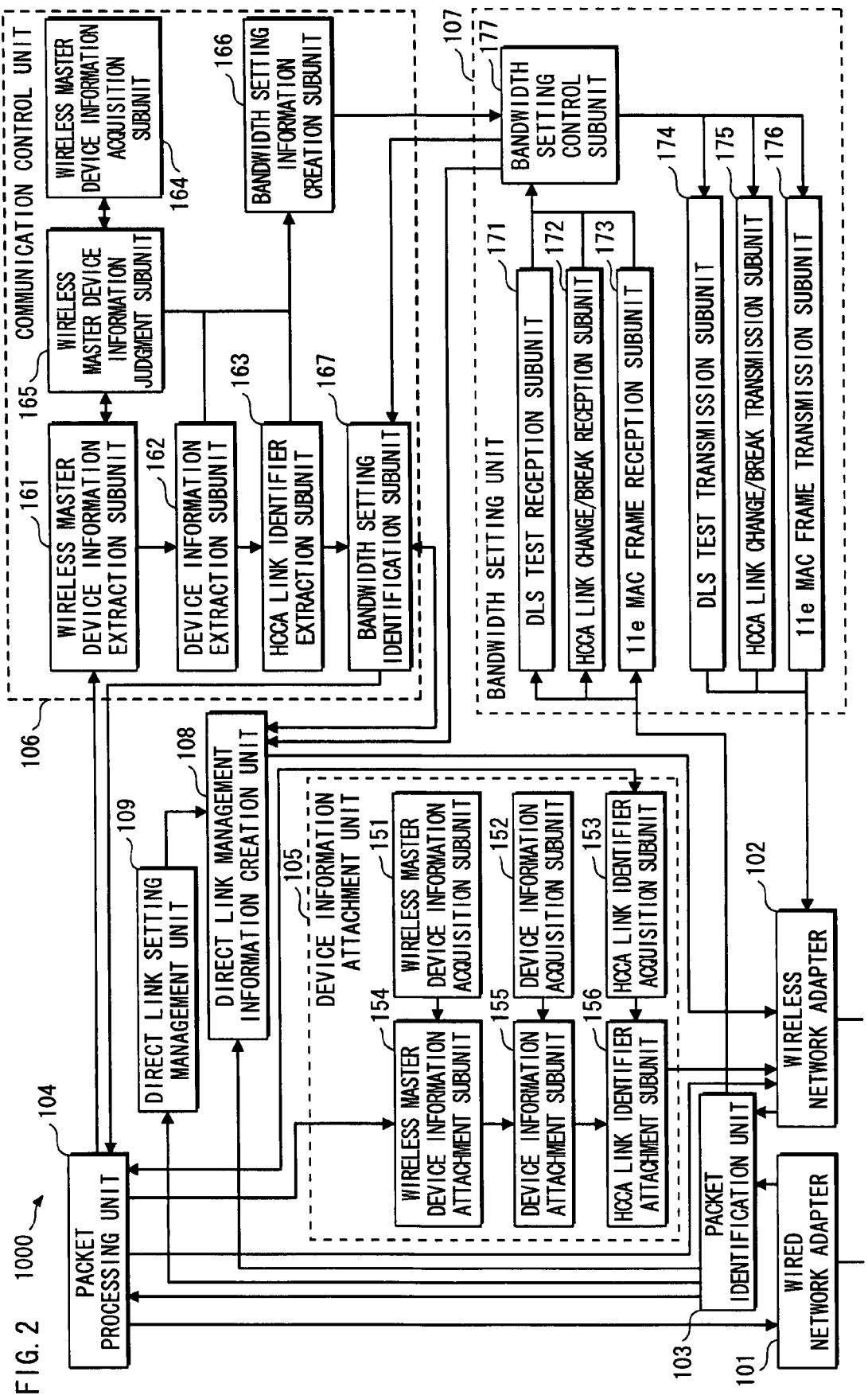
FIG. 2 is a functional block diagram showing a structure of a wireless slave device 1000 of the present invention.

FIG. 2 is a functional block diagram showing a structure of the wireless slave device 1000 of the present invention. The wireless slave devices 1000*a* and 1000*b* have the same structure as the wireless slave device 1000.

As shown in FIG. 1, the wireless slave device 1000 includes a wired network adapter 101, a wireless network adapter 102, a packet identification unit 103, a packet processing unit 104, a device information attachment unit 105, a communication control unit 106, a bandwidth setting unit 107, a Direct Link management information creation unit 108, and a Direct Link setting management unit 109.

Also, the device information attachment unit 105 includes a wireless master device information acquisition subunit 151, a device information acquisition subunit 152, an HCCA link identifier acquisition subunit 153, a wireless master device information attachment subunit 154, a device information attachment subunit 155, and an HCCA link identifier attachment subunit 156.

Also, the communication control unit 106 includes a wireless master device information extraction subunit 161, a device information extraction subunit 162, an HCCA link identifier extraction subunit 163, a wireless master device information acquisition subunit 164, a wireless master device information judgment subunit 165, a bandwidth setting information creation subunit 166, and a bandwidth setting identification subunit 167.

Also, the bandwidth setting unit 107 includes a DLS test reception subunit 171, an HCCA link change/break reception subunit 172, an 11e MAC frame reception subunit 173, a DLS test transmission subunit 174, an HCCA link change/break transmission subunit 175, an 11e MAC frame transmission subunit 176, and a bandwidth setting control subunit 177.

The wired network adapter 101 demodulates data received as input from a wired network, and outputs the demodulated data to the packet identification unit 103. The wired network adapter 101 also modulates data to be output to the wired network.

The wireless network adapter 102 demodulates data received as input from a wireless network, and outputs the demodulated data to the packet identification unit 103. The wireless network adapter 102 also modulates data to be output to the wireless network.

The packet identification unit 103 receives the data output from the wired network adapter 101 and the wireless network adapter 102, and identifies the received data. The packet identification unit 103 outputs the identified data to the packet processing unit 104, the bandwidth setting unit 107, and the like.

The packet processing unit 104 receives a bandwidth setting packet identified by the packet identification unit 103, outputs the received bandwidth setting packet to the communication control unit 106, and under control thereof, performs processing for transferring the bandwidth setting packet via the wired network adapter 101 or the wireless network adapter 102. Specifically, the packet processing unit 104 performs processing for including information pertaining to ensured bandwidth etc. in the bandwidth setting packet and transmitting the resulting bandwidth setting packet to the wireless master device, the content reception terminal, etc., processing for causing the device information attachment unit 105 to attach device information regarding itself to the bandwidth setting packet and causing the wireless network adapter 102 to output the resulting bandwidth setting packet, and other processing.

The device information attachment unit 105 attaches the device information regarding the wireless slave device 1000 to the bandwidth setting packet output by the packet processing unit 104, and outputs the resulting bandwidth setting packet to the wireless network adapter 102.

The communication control unit 106 receives the bandwidth setting packet from the packet processing unit 104, analyzes the received bandwidth setting packet, and in accordance with a result of the analysis, controls the execution of bandwidth setting packet transfer processing and processing pertaining to bandwidth setting. Specifically, the communication control unit 106 performs processing for controlling the packet processing unit 104 to attach the device information regarding the wireless slave device 1000 to the bandwidth setting packet, and if device information is attached to a received bandwidth setting packet, processing for controlling the bandwidth setting unit 107 to establish direct communication with the wireless slave device that attached the device information. Note that the device information is information that pertains to a wireless slave device, and includes information necessary for establishing direct communication between wireless slave devices (e.g., a MAC address).

Under control of the communication control unit 106, the bandwidth setting unit 107 performs bandwidth setting processing with the wireless master device, and other processing regarding bandwidth setting, such as establishing direct communication with another wireless slave device.

Under control of the communication control unit 106, the Direct Link management information creation subunit 108 creates a packet for notifying that the wireless slave device 1000 has set up a Direct Link.

The Direct Link setting management unit 109 manages a Direct Link set up between the wireless slave device 1000 and the other wireless slave device.

The following describes details of the function blocks included in the device information attachment unit 105.

The wireless master device information acquisition subunit 151 acquires information regarding the wireless master device to which the wireless slave device 1000 is connected, such as a BSSID (Basic Service Set Identifier) and the MAC address of the wireless master device.

The device information acquisition subunit 152 acquires information regarding the wireless slave device 1000, such as its own MAC address.

The HCCA link identifier acquisition subunit 153 acquires, from the packet processing unit 104, an identifier that identifies the HCCA set up between the wireless slave device 1000 and the wireless master device.

The wireless master device information attachment subunit 154 attaches the information acquired by the wireless master device information acquisition subunit 151 to the bandwidth setting packet output from the packet processing unit 104.

The device information attachment subunit 155 attaches the information acquired by the device information acquisition subunit 152 to the bandwidth setting packet output from the packet processing unit 104.

The HCCA link identifier attachment subunit 156 attaches the HCCA identifier acquired by the HCCA link identifier acquisition subunit 153 to the bandwidth setting packet output from the packet processing unit 104.

The following describes details of the function blocks included in the communication control unit 106.

The wireless master device information extraction subunit 161 extracts, from the device information attached to the bandwidth setting packet output from the packet processing unit 104, information regarding the wireless master device that is connected to the other wireless slave device that attached the device information to the received bandwidth setting packet. The wireless master device information extraction subunit 161 outputs the extracted information to the wireless master device information judgment subunit 165.

The device information extraction subunit 162 extracts, from the device information attached to the received bandwidth setting packet, information regarding the other wireless slave device that attached the device information to the bandwidth setting packet. The device information extraction subunit 162 outputs the extracted information to the bandwidth setting information creation subunit 166.

The HCCA link identifier extraction subunit 163 extracts, from the device information attached to the received bandwidth setting packet, the identifier identifying the HCCA set up between the wireless master device and the other wireless slave device that attached the device information to the bandwidth setting packet. The HCCA link identifier extraction subunit 163 outputs the extracted information to the bandwidth setting information creation subunit 166.

The wireless master device information acquisition subunit 164 acquires information regarding the wireless master device connected to the wireless slave device 1000, and outputs the acquired information to the wireless master device information judgment subunit 165.

The wireless master device information judgment subunit 165 compares the information regarding the wireless master device connected to the other wireless slave device, which was extracted by the wireless master device information extraction subunit 161, and the information regarding the wireless master device connected to the wireless slave device 1000, which was acquired by the wireless master device information acquisition subunit 164, to judge whether the wireless slave device 1000 and the other wireless slave device are connected to the same wireless master device. In other words, the wireless master device information judgment subunit 165 judges that the wireless slave device 1000 and the other wireless slave device are connected to the same wireless master device if the information output from the wireless master device information extraction subunit 161 and the information output from the wireless master device information acquisition subunit 164 match. The wireless master device information judgment subunit 165 outputs the result of the judgment to the bandwidth setting information creation subunit 166. Note that if the wireless master device information extraction subunit 161 could not extract the device information, the wireless master device information judgment subunit 165 receives the result of the extraction, judges that device information is not attached to the bandwidth setting packet, and outputs the result of the judgment to the bandwidth setting information creation subunit 166.

The bandwidth setting information creation subunit 166 receives the judgment result from the wireless master device information judgment subunit 165, the information extracted by the device information extraction subunit 162, and the information extracted by the HCCA link identifier extraction subunit 163, and with use of the received information, creates bandwidth setting information for controlling the bandwidth setting unit 107 to perform bandwidth setting with the other device. The bandwidth setting information creation subunit 166 outputs the created bandwidth setting information to the bandwidth setting unit 107. Specifically, if the result of the judgment performed by the wireless master device information judgment subunit 165 is that the wireless slave device 1000 and the other wireless slave device that attached the device information to the bandwidth setting packet are connected to the same wireless master device, the bandwidth setting information creation subunit 166 creates bandwidth setting information for establishing direct communication with the other wireless slave device. Also, if the wireless master device information judgment subunit 165 has judged that device information is not attached to the bandwidth setting packet, the bandwidth setting information creation subunit 166 receives the judgment result, and creates bandwidth setting information for establishing an HCCA link with the wireless master device.

The bandwidth setting identification subunit 167 identifies the amount of bandwidth set in the wireless slave device 1000, and in accordance with a result of the identification, performs processing such as packet transfer and transmission of a Direct Link management request which is described later. Specifically, the bandwidth setting identification subunit 167 receives a bandwidth setting result from the bandwidth setting unit 107, and based on the received result, controls the processing performed by the packet processing unit 104 for transferring the bandwidth setting packet. Also, when the wireless slave device 1000 has set up a Direct Link, the bandwidth setting identification subunit 167 performs processing for instructing the Direct Link management information creation unit 108 to create a Direct Link management request in order to notify other terminals that bandwidth is being ensured for the Direct Link.

The following describes details of the function blocks included in the bandwidth setting unit 107.

The DLS test reception subunit 171 receives a DLS test request received from the other wireless slave device in order to judge whether direct communication is possible, and a DLS test response, which is a response to a DLS test request sent by the wireless slave device 1000. The DLS test reception subunit 171 analyzes the received DLS test request or the DLS test response, and outputs a result of the analysis to the bandwidth setting control subunit 177. In other words, upon receiving a DLS test request, the DLS test reception subunit 171 outputs a result indicating that the DLS test request has been received, and upon receiving a DLS test response, analyzes the type of response that has been received from the wireless slave device, and outputs the result of the analysis. Note that the communication performed between the wireless slave devices regarding the DLS test request and the DLS test response is described in detail later.

The HCCA link change/break reception subunit 172 receives an HCCA link change request or HCCA link break request that has been transmitted from the other wireless slave device for changing or breaking the HCCA link established between the wireless slave device 1000 and the other wireless slave device. The HCCA link change/break reception subunit 172 analyzes the received HCCA link change or break request, and outputs a result of the analysis to the bandwidth setting control subunit 177. Note that the communication performed between the wireless slave devices regarding the HCCA link change and break requests is described in detail later.

The 11e MAC frame reception subunit 173 receives a MAC frame defined by the IEEE 802.11e standard, analyzes the received MAC frame, and outputs a result of the analysis to the bandwidth setting control subunit 177. The MAC frame defined by the IEEE 802.11e standard is, for example, an HCCA or DLS setting frame.

Under control of the bandwidth setting control subunit 177, the DLS test transmission subunit 174 creates a DLS test request or a DLS test response, and performs transmission thereof.

Under control of the bandwidth setting control subunit 177, the HCCA link change/break transmission subunit 175 transmits an HCCA link change request or an HCCA link break request to another wireless slave device.

Under control of the bandwidth setting control subunit 177, the 11e MAC frame transmission subunit 176 creates a MAC frame defined by the IEEE 802.11e standard, and transmits the created MAC frame.

The bandwidth setting control subunit 177 receives the bandwidth setting information created by the bandwidth setting information creation subunit 166 of the communication control unit 106, and controls the DLS test transmission subunit 174, the HCCA link change/break transmission subunit 175 and the 11e MAC frame transmission subunit 176 so as to transmit a DLS test etc. in order to perform bandwidth setting with the wireless master device and the wireless slave device. The bandwidth setting control subunit 177 also receives the information output from the DLS test reception subunit 171, the HCCA link change/break reception subunit 172 and the 11e MAC frame reception subunit 173, and performs processing such as transferring the received information to the communication control unit 106.

Note that in the following description, "a" has been appended to the reference notations of the function blocks of the wireless slave device 1000*a*, such as a packet identification unit 103*a* and a packet processing unit 104*a*. Similarly, "b" has been appended to the reference notations of the function blocks of the wireless slave device 1000*b*, such as a packet identification unit 103*b* and a packet processing unit 104*b*.

Also, the aforementioned constituent elements constitute a computer system composed of specifically a CPU (Central Processing Unit), a ROM (Read Only Memory), a RAM (Random Access Memory), a LAN (Local Area Network) interface, etc., and communication with another device is performed in accordance with a program stored in the ROM.

Data

The following is a detailed description of device information that is attached to a bandwidth setting packet by the device information attachment unit 105.

Figure 3A:
FIGS. 3A and 3B show a bandwidth setting packet 301 and device information 302 respectively.
Figure 3B:

FIGS. 3A and 3B show a bandwidth setting packet 301 and device information 302 respectively.

The bandwidth packet 301 shown in FIG. 3A is transmitted by the content transmission terminal 1.

As shown in FIG. 3A, the bandwidth setting packet 301 includes information indicating a required bandwidth for the content transmission terminal 1. The bandwidth setting packet 301 also includes a content identifier for content to be transmitted by the content transmission terminal 1. The bandwidth setting packet 301 further includes information indicating a judgment result pertaining to whether relay devices existing on the communication channel between the content transmission terminal 1 and the content reception terminal 2 have ensured the required bandwidth, and information indicating the amount of bandwidth that can be ensured by the relay devices.

FIG. 3B shows the device information 302, which is attached to the bandwidth setting packet by the device information attachment unit 105 of the wireless slave device 1000.

As shown in FIG. 3B, the device information 302 includes the MAC address of the wireless master device connected to the wireless slave device 1000, the MAC address of the wireless slave device 1000, and an identifier of the HCCA link set up therebetween. Note that the MAC address of the wireless master device may be a BSSID. Also, the identifier of the HCCA link may include a TSID (Traffic Stream Identify) value for identifying the HCCA.

Operations

The following describes an overview and details of operation's of the wireless slave device 1000.

In the present embodiment, upon receiving a bandwidth setting packet, the wireless slave device 1000*a* that is connected to the content transmission terminal 1 attaches device information regarding the wireless slave device 1000*a* to the received bandwidth setting packet, and transmits the resulting bandwidth setting packet to the wireless master device. Upon receiving the bandwidth setting packet from the wireless master device, the wireless slave device 1000*b* detects that device information is attached to the received bandwidth setting packet, establishes direct communication with the wireless slave device 1000*a*, which attached the device information, and transmits a bandwidth setting packet to the content reception terminal 2.

Upon receiving a bandwidth setting packet, the wireless slave devices 1000*a* and 1000*b* judge whether device information is attached. If device information is not attached, the devices 1000*a* and 1000*b* attach device information to the received bandwidth setting packet and transmit the resulting bandwidth setting packet to the wireless master device to which they are connected. If device information is attached, the devices 1000*a* and 1000*b* establish direct communication with another wireless slave device based on the attached device information.

Figure 4:
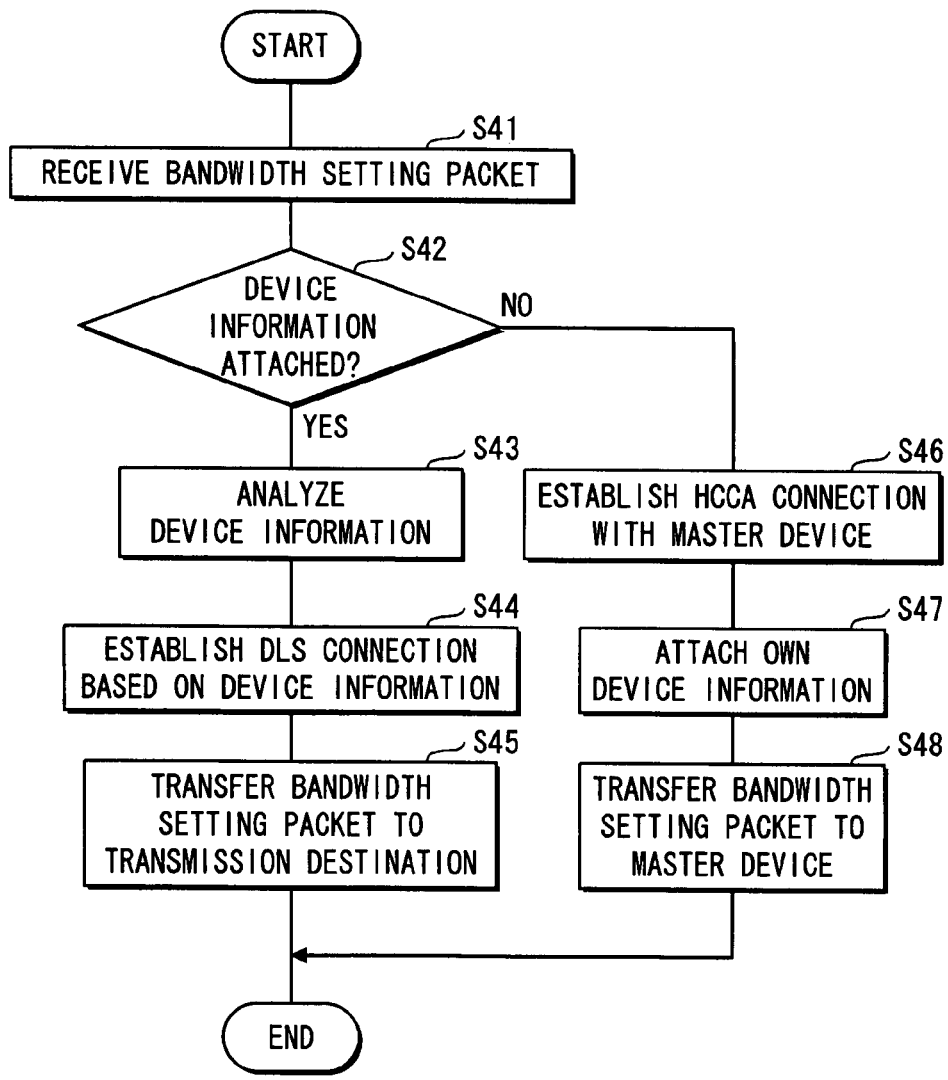
FIG. 4 is a flowchart showing operations performed when the wireless slave device 1000 has received a bandwidth setting packet.

FIG. 4 is a flowchart showing operations performed when the wireless slave device 1000 (1000*a* and 1000*b*) receives a bandwidth setting packet.

As shown in FIG. 4, upon receiving a bandwidth setting packet transmitted by the content transmission terminal 1 (step S41), the wireless slave device 1000 judges whether the received packet includes device information that has been attached by another wireless slave device (step S42).

If a result of the judgment is affirmative (step S42:YES), the wireless slave device 1000 analyzes the device information (step S43), and based on a result of the analysis, establishes a DLS connection with the wireless slave device that attached the device information to the bandwidth setting packet (step S44).

After establishing the DLS connection, the wireless slave device 1000 transmits the bandwidth setting packet to the content reception terminal 2 (step S45).

Also, if the judgment in step S42 is negative (step S42:NO), the wireless slave device 1000 establishes an HCCA connection with the wireless master device (step S46). Upon establishing the HCCA connection, the wireless slave device 1000 attaches device information pertaining thereto to the received bandwidth setting packet (step S47). Upon attaching the device information to the bandwidth setting packet, the wireless slave device 1000 transmits the resulting bandwidth setting packet to the wireless master device (step S48).

Note that if the wireless slave device 1000 has been requested by another wireless slave device to establish direct communication, the wireless slave device 1000 establishes direct communication according to the IEEE 802.11e standard. Also, although in steps S46 and S47 the wireless slave device 1000*a* attaches device information pertaining thereto to the bandwidth setting packet after establishing an HCCA connection with the wireless master device, the present invention is not limited to this. The wireless slave device 1000 may establish an HCCA connection with the wireless master device after having attached the device information.

This completes the overview of operations performed by the wireless slave device 1000. The following describes the function blocks of the wireless slave device 1000 and operations thereof in more detail, with reference to the drawings.

Figure 5:
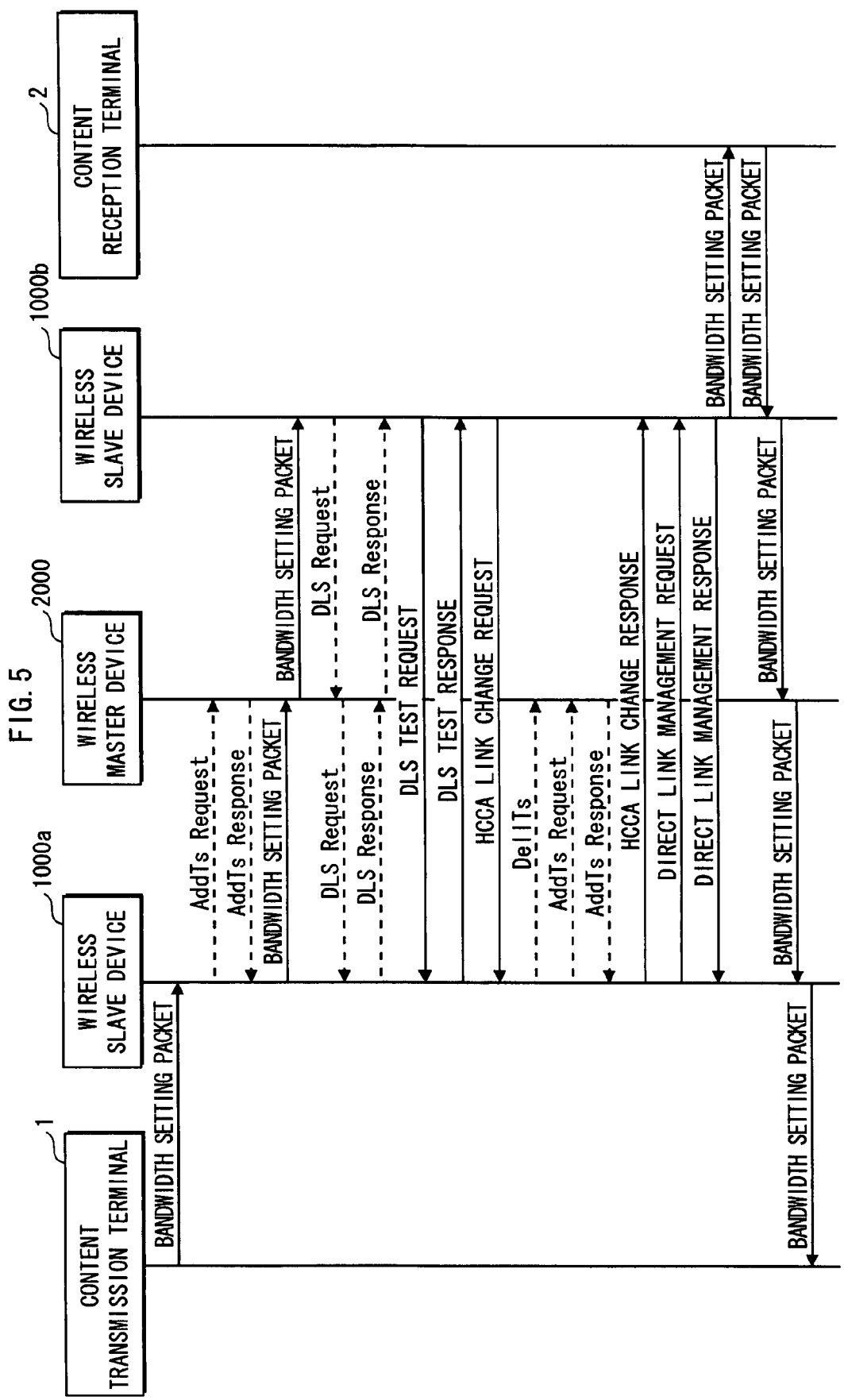
FIG. 5 shows details of communication performed by a wireless slave device 1000a and a wireless slave device 1000b when a content transmission terminal 1 transmits a bandwidth setting packet to a content reception terminal 2.

FIG. 5 shows details of communication between the wireless slave devices 1000*a* and 1000*b* when the content transmission terminal 1 transmits a bandwidth setting packet to the content reception terminal 2.

As shown in FIG. 5, before transmitting data to the content reception terminal 2, the content transmission terminal 1 transmits the bandwidth setting packet shown in FIG. 4A to the content reception terminal 2 in order to ensure a sufficient amount of bandwidth. The bandwidth setting packet is relayed by the wireless slave device 1000*a*.

Upon receiving data from the content transmission terminal 1 via the wired network adapter unit 101*a*, the wireless slave device 1000*a* outputs the received data to the packet identification unit 103*a*.

The packet identification unit 103*a* identifies the received data as a bandwidth setting packet, and outputs the bandwidth setting packet to the packet processing unit 104*a*.

The packet processing unit 104*a* receives the bandwidth setting packet from the packet identification unit 103*a*, and outputs the bandwidth setting packet to the communication control unit 106*a*.

The communication control unit 106*a* receives the bandwidth setting packet from the packet processing unit 104*a*, and judges whether device information has been attached to the bandwidth setting packet by another wireless slave device. This judgment corresponds to step S42 in the flowchart of FIG. 4. First, the wireless master device information extraction subunit 161*a* attempts to extract, from the bandwidth setting packet, information regarding the wireless master device, which has been attached by the other wireless slave device.

However, the information regarding the wireless master device cannot be extracted since a wireless slave device has not attached device information to the bandwidth setting packet. This extraction result is output to the wireless master device information judgment subunit 165*a*. Upon receiving the extraction result, the wireless master device information judgment subunit 165*a* judges that device information is not attached to the bandwidth setting packet, and outputs a notification to this effect to the bandwidth setting information creation subunit 166*a*. Similarly, the device information extraction subunit 162*a* and HCCA link identifier extraction subunit 163*a* both notify the bandwidth setting information creation subunit 166*a* that information regarding the wireless slave device 1000*a* and an HCCA link identifier could not be extracted from the bandwidth setting packet.

The bandwidth setting information creation subunit 166*a* determines that information is not attached to the bandwidth setting packet, based on the information received from the wireless master device information judgment subunit 165*a*, the device information extraction subunit 162*a* and the HCCA link identifier extraction subunit 163*a*. Thereafter, the bandwidth setting unit 107*a* is controlled to perform HCCA setting in order to perform bandwidth setting with the wireless master device. Specifically, the bandwidth setting control subunit 177*a* of the bandwidth setting unit 107*a* sets up an HCCA link with the wireless master device 2000 in order to ensure the required amount of bandwidth indicated in the bandwidth setting packet.

Upon receiving an HCCA link setup instruction from the communication control unit 106*a*, the bandwidth setting control subunit 177*a* causes the 11e MAC frame transmission subunit 176*a* to transmit an AddTs Request to the wireless master device 2000 in order to set up an HCCA Up Link (from the wireless slave device 1000*a* to the wireless master device 2000). The AddTs Request is transmitted from the 11e MAC frame transmission subunit 176*a* to the wireless master device 2000 via the wireless network adapter 102*a*. In FIG. 5, this AddTs Request is shown by a dashed line. This processing corresponds to step S46 in the flowchart of FIG. 4.

Upon receiving the AddTs Request from the wireless slave device 1000*a*, the wireless master device 2000 judges whether the bandwidth requested by the wireless slave device 1000*a* can be allocated, and transmits an AddTs Response including information indicating a result of the judgment to the wireless slave device 1000*a*. In FIG. 5, this AddTs Response is shown by a dashed line.

Here, the wireless master device 2000 is assumed to permit allocation of the bandwidth requested by the wireless slave device 1000*a*.

Upon receiving the AddTs Response from the wireless master device 2000 via the wireless network adapter 102*a*, the wireless slave device 1000*a* outputs the received AddTs Response to the packet identification unit 103*a*. The packet identification unit 103a identifies the received data as an AddTs Response, and outputs the AddTs Response to the bandwidth setting unit 107a.

The bandwidth setting unit 107a receives the AddTs Response by the 11e MAC frame reception subunit 173a, which extracts the result of the bandwidth allocation included in the AddTs Response and outputs the extraction result to the bandwidth setting control subunit 177a.

The bandwidth setting control subunit 177a outputs the received extraction result to the bandwidth setting identification subunit 167a of the communication control unit 106a.

The bandwidth setting identification subunit 167a receives the bandwidth allocation result from the bandwidth setting control subunit 177a, and outputs information indicating that the bandwidth has been allocated, in order to cause the packet processing unit 104a to transfer a bandwidth setting packet.

Upon receiving the bandwidth allocation result from the bandwidth setting identification subunit 167a, which indicates that bandwidth has been allocated, the packet processing unit 104a records "successful" as the judgment result in the bandwidth setting packet shown in FIG. 3A, transfers the bandwidth setting packet to the device information attachment unit 105a, which attaches device information regarding the wireless slave device 1000a to the bandwidth setting packet. Note that if the bandwidth allocation result is "failure", the packet processing unit 104 does not cause device information to be attached, records "failure" as the judgment result in the bandwidth setting packet, and transmits the bandwidth setting packet via the wireless network adapter. Upon judging that information indicating "failure" is included in the judgment result of the bandwidth setting packet, other devices also transfer the bandwidth setting packet without performing bandwidth setting.

Upon receiving an input of a bandwidth setting packet that includes "successful" as the judgment result, the device information attachment unit 105a causes the wireless master device information attachment subunit 154a, the device information attachment subunit 155a and the HCCA link identifier attachment subunit 156a to attach the device information shown in FIG. 3B to the bandwidth setting packet. This processing corresponds to step S47 in the flowchart of FIG. 4. The device information attachment unit 105a outputs the resulting bandwidth setting packet to the wireless network adapter 102a.

The wireless network adapter 102a transmits the bandwidth setting packet, with device information attached, to the wireless master device 2000 in accordance with the polling control performed by the wireless master device 2000. This processing corresponds to step S48 in the flowchart of FIG. 4. In FIG. 5, this bandwidth setting packet is shown by a solid line.

Note that if the wireless slave device 1000a transmits an AddTs Response and allocation of the requested bandwidth is not permitted by the wireless master device, the wireless slave device 1000a records "failure" as the judgment result of the bandwidth setting packet, and transmits the bandwidth setting packet to the wireless master device 2000 without causing the device information attachment unit 105 to attach device information. Thereafter, devices that are to perform bandwidth allocation based on the bandwidth setting packet judge that "failure" has been recorded as the judgment result in the bandwidth setting packet, and transfer the bandwidth setting packet to the next relay device without performing bandwidth allocation since one of the relay devices on the communication channel between the content transmission terminal 1 and the content reception terminal 2 has failed to perform bandwidth allocation.

The wireless master device 2000 receives the bandwidth setting packet from the wireless slave device 1000a, and transfers the received bandwidth setting packet to the wireless slave device 1000b. In FIG. 5, this bandwidth setting packet is shown by a solid line.

The wireless network adapter 102b of the wireless slave device 1000b receives the data from the wireless master device 2000, and outputs the received data to the packet identification unit 103b.

Upon identifying the received data as a bandwidth setting packet, the packet identification unit 103b outputs the bandwidth setting packet to the packet processing unit 104b.

The packet processing unit 104b receives the bandwidth setting packet from the packet identification unit 103b, and refers to the information recorded in the judgment result thereof. If "success" is recorded as the judgment result, the packet processing unit 104b outputs the bandwidth setting packet to the communication control unit 106b. Note that if information indicating "failure" is recorded as the judgment result, the packet processing unit 104b transmits the bandwidth setting packet to the content reception terminal 2 via the wired network adapter 101b.

Upon receiving the bandwidth setting packet from the packet processing unit 104b, the communication control unit 106b causes the wireless master device information extraction subunit 161b to extract, from the bandwidth setting packet, information regarding the wireless master device 2000 that has been attached by the wireless slave device 1000a. The wireless master device information extraction subunit 161b outputs a result of the extraction to the wireless master device information judgment subunit 165b. The wireless master device information judgment subunit 165b acquires, from the wireless master device information acquisition subunit 164b, information regarding the wireless master device 2000 connected to the wireless slave device 1000b, and compares the acquired information to the extraction result received from the wireless master device information extraction subunit 161b. Here, the wireless master device information judgment subunit 165b judges that device information is attached since the information received from the wireless master device information extraction subunit 161b and the wireless master device information acquisition subunit 164b are the same. The wireless master device information judgment subunit 165b outputs the result of the judgment to the bandwidth setting information creation subunit 166b.

The bandwidth setting information creation subunit 166b receives the judgment result from the wireless master device information judgment subunit 165b, and in order to perform direct communication with the other wireless slave device connected to the same wireless master device, creates bandwidth setting information that instructs the bandwidth setting unit 107b to establish direct communication with the wireless slave device 1000a that attached the device information to the bandwidth setting packet. Note that the MAC address of the wireless slave device 1000a with which direct communication is to be established is indicated in the device information attached to the bandwidth setting packet. Also, it is necessary to change the HCCA link set up with the wireless master device 2000 by the wireless slave device 1000a to Direct Link in order to establish direct communication with the wireless slave device 1000a. Here, the identifier of the HCCA link to be changed is also indicated in the device information. Also, if the result of the judgment by the wireless master device information judgment subunit 165b is that the wireless slave device 1000b and the wireless slave device that attached the device information are not connected to the same wireless master device, the bandwidth setting information creation subunit 166b creates bandwidth setting information which instructs that direct communication not be performed.

The bandwidth setting control subunit 177b of the bandwidth setting unit 107b receives, from the bandwidth setting information creation subunit 166b, the bandwidth setting information that instructs the establishment of direct communication with the wireless slave device 1000a indicated in the device information, and causes the 11e MAC frame transmission subunit 176b to transmit, via the wireless master device 2000, a DLS Request to the MAC address of the wireless slave device 1000a that has been specified by the bandwidth setting information creation subunit 166b. Note that if the bandwidth setting information instructs that direct communication not be established, the bandwidth setting control subunit 177b outputs information to this effect to the bandwidth setting identification subunit 167b, which identifies the information as such, and transfers the information to the packet processing unit 104. The packet processing unit 104 transmits the bandwidth setting packet to the content reception terminal 2 via the wired network adapter 101b.

After the 11e MAC frame transmission subunit 176b has transmitted the DLS Request to the wireless master device 2000 via the wireless network adapter 102b, the wireless master device 2000 transfers the received DLS Request to the wireless slave device 1000a.

The wireless slave device 1000a receives the DLS Request and transmits a DLS Response to the wireless slave device 1000b via the wireless master device 2000. Here, the result of the DLS is that the wireless slave device 1000a is compatible with direct communication. In FIG. 5, the DLS Request and DLS Response exchanged between the wireless slave devices 1000a and 1000b are shown by dashed lines.

The wireless network adapter 102b of the wireless slave device 1000b receives the DLS Response via the wireless master device 2000. The received DLS Response is identified by the packet identification unit 103b, and output to the bandwidth setting unit 107b. The 11e MAC frame reception subunit 173b of the bandwidth setting unit 107b analyzes the DLS test result. As a result of the analysis, the 11e MAC frame reception subunit 173b outputs, to the bandwidth setting control subunit 177b, the DLS test result, which indicates that the wireless slave device 1000a is compatible with direct communication.

The bandwidth setting control subunit 177b receives the DLS test result, and the DLS test transmission subunit 174b directly transmits, to the wireless slave device 1000a without passing through the wireless master device 2000, a DLS test request for testing whether direct communication with the wireless slave device 1000a is possible.

The wireless slave device 1000a receives the DLS test request via the wireless network adapter 102a, and the packet identification unit 103a outputs the received DLS test request to the bandwidth setting unit 107a.

The DLS test reception subunit 171a of the bandwidth setting unit 107a receives the DLS test request, and the bandwidth setting control subunit 177a causes the DLS test transmission subunit 174a to directly transmit a DLS test response, which is a response to the DLS test request, to the wireless slave device 1000b. Here, it is assumed that direct communication between the wireless slave devices 1000a and 1000b is possible.

The wireless slave device 1000b receives the DLS test response from the wireless slave device 1000a. The DLS test reception subunit 171b analyzes the DLS test response, and notifies the bandwidth setting control subunit 177b that direct communication is possible.

Given that direct communication with the wireless slave device 1000a is possible, the bandwidth setting control subunit 177b causes the HCCA link change/break transmission subunit 175b to transmit, to the wireless slave device 1000a, an HCCA link change request that includes a request to change the HCCA bandwidth set with the wireless master device 2000 to bandwidth for a Direct Link, in order to perform direct communication. This is because it is assumed that the bandwidth of the HCCA (Up Link) set up between the wireless slave device 1000a and the wireless master device 2000 is for communicating with the wireless master device 2000. Note that the HCCA link change request includes a TSID identifying the HCCA to be changed by the wireless slave device 1000a, and the MAC address of the wireless slave device 1000b. The identifier of the HCCA to be changed by the wireless slave device 1000a is indicated in the device information that the wireless slave device 1000a attached to the bandwidth setting packet. In FIG. 5, communication performed between the wireless slave devices 1000a and 1000b to exchange the DLS test request, the DLS test response, and the HCCA link change request is shown by solid lines.

Note that if the result included in the DLS Response is "failed", the content of the DLS test response indicates that direct communication is not possible, or the DLS test response has not been received during a predetermined time period, the bandwidth setting unit 107b sets up a HCCA Down Link with the wireless master device 2000.

Upon receiving the HCCA link change request from the wireless slave device 1000b, the wireless slave device 1000a performs processing for changing the HCCA indicated by the TSID included in the received HCCA link change request from an Up Link to a Direct Link. Specifically, under control of the bandwidth setting unit 107a, a DelTs is transmitted to the wireless master device 2000 in order to break the HCCA Up Link set up with the wireless master device 2000. The wireless slave device 1000a then sets up a Direct Link, and transmits an AddTs Request to the wireless master device 2000. The wireless master device 2000 transmits an AddTs Response to the wireless slave device 1000a, thereby setting an HCCA Direct Link between the wireless master device 2000 and the wireless slave device 1000a. In FIG. 5, communication performed between the wireless slave device 1000a and the wireless master device 2000 while changing the Up Link HCCA to a Direct Link is shown by dashed lines. Note that instead of breaking the Up Link HCCA before setting the Direct Link HCCA, the Direct Link may be set up without breaking the Up Link HCCA if the wireless master device is compatible with such processing.

The bandwidth setting control subunit 177a of the wireless slave device 1000a sets up a Direct Link HCCA with the wireless master device 2000, and the HCCA link change/break transmission subunit 175a transmits, to the wireless slave device 1000b via the wireless network adapter 102a, an HCCA link change response indicating that the HCCA setting has been changed to Direct Link. In FIG. 5, the HCCA link change response is shown by a solid line.

Upon transmission of the HCCA link change response to the wireless slave device 1000b, the bandwidth setting control subunit 177a outputs, to the bandwidth setting identification subunit 167a, information indicating that the wireless slave device 1000a has set up a Direct Link.

Upon identifying the information indicating that the wireless slave device 1000a has set up a Direct Link, the bandwidth setting identification subunit 167a instructs the Direct Link management information creation unit 108a to create a Direct Link management request for notifying the wireless slave device 1000b that the Direct Link has been set up.

Upon receiving the instruction from the bandwidth setting identification subunit 167a, the Direct Link management information creation unit 108a creates a Direct Link management request, and transmits the created Direct Link management request to the wireless slave device 1000b via the wireless network adapter 102b.

When the wireless network adapter 102b of the wireless slave device 1000b receives the HCCA link change response, the packet identification unit 103b identifies the received HCCA link change response, and outputs the HCCA link change response to the bandwidth setting unit 107b.

The HCCA link change/break reception subunit 172b receives and analyzes the HCCA link change response, and outputs, to the bandwidth setting control subunit 177b, information indicating that the wireless slave device 1000a has changed the HCCA from Up Link to Direct Link.

The bandwidth setting control subunit 177b receives the information, and outputs the received information to the bandwidth setting identification subunit 167b.

Thereafter, the wireless slave device 1000b waits until the Direct Link management request is received from the wireless slave device 1000a. Upon reception of a Direct Link management request, the packet identification unit 103b identifies the received Direct Link management request, and transmits the received Direct Link management request to the Direct Link setting management unit 109b. Upon receiving the Direct Link management request, the Direct Link setting management unit 109b stores information indicating that the wireless slave device 1000a has set up a Direct Link. Note that the Direct Link setting management unit 109b stores the information in correspondence with the wireless slave device 1000a and the HCCA link identifier.

The Direct Link setting management unit 109b instructs the Direct Link management information creation unit 108b to create a Direct Link management response, which is a response to the Direct Link management request, in order to notify the wireless slave device 1000a that storage of the information indicating that the wireless slave device 1000a has set up a Direct Link has been completed.

The Direct Link management information creation unit 108b receives the instruction from the Direct Link setting management unit 109b, creates a Direct Link management response, and transmits the created Direct Link management response to the wireless slave device 1000a via the wireless network adapter 102b. The Direct Link management information creation unit 108b also outputs, to the bandwidth setting identification subunit 167b, information indicating that the Direct Link management response has been created and transmitted. In FIG. 5, the Direct Link management request and Direct Link management response exchanged between the wireless slave devices 1000a and 1000b are shown by solid lines.

The bandwidth setting identification subunit 167b of the wireless slave device 1000b receives the information indicating that the Direct Link management information creation unit 108b has transmitted the Direct Link management response, and instructs the packet processing unit 104b to transmit a bandwidth setting packet to the content reception terminal 2 via the wired network adapter 101b.

The packet processing unit 104b' receives the instruction from the bandwidth setting identification subunit 167b, and transmits a bandwidth setting packet to the content reception terminal 2 via the wired network adapter 101b.

Upon receiving the bandwidth setting packet from the wireless slave device 1000b, the content reception terminal 2 transmits a bandwidth setting packet, which is a response to the received bandwidth setting packet, to the content transmission terminal 1 via the wireless slave device 1000b, the wireless master device 2000, and the wireless slave device 1000a.

Variation 1

The following is a specific description of processing in a case of the content reception terminal 2 that is to receive data transmitting a bandwidth setting packet to the content transmission terminal 1, with reference to the drawings.

Note that specific descriptions of operations performed by function blocks of the wireless slave devices to exchange the AddTs Request, the DLS Request, the DLS test request, the Direct Link management request, etc. have been omitted since they have been described in the above embodiment.

Figure 6:
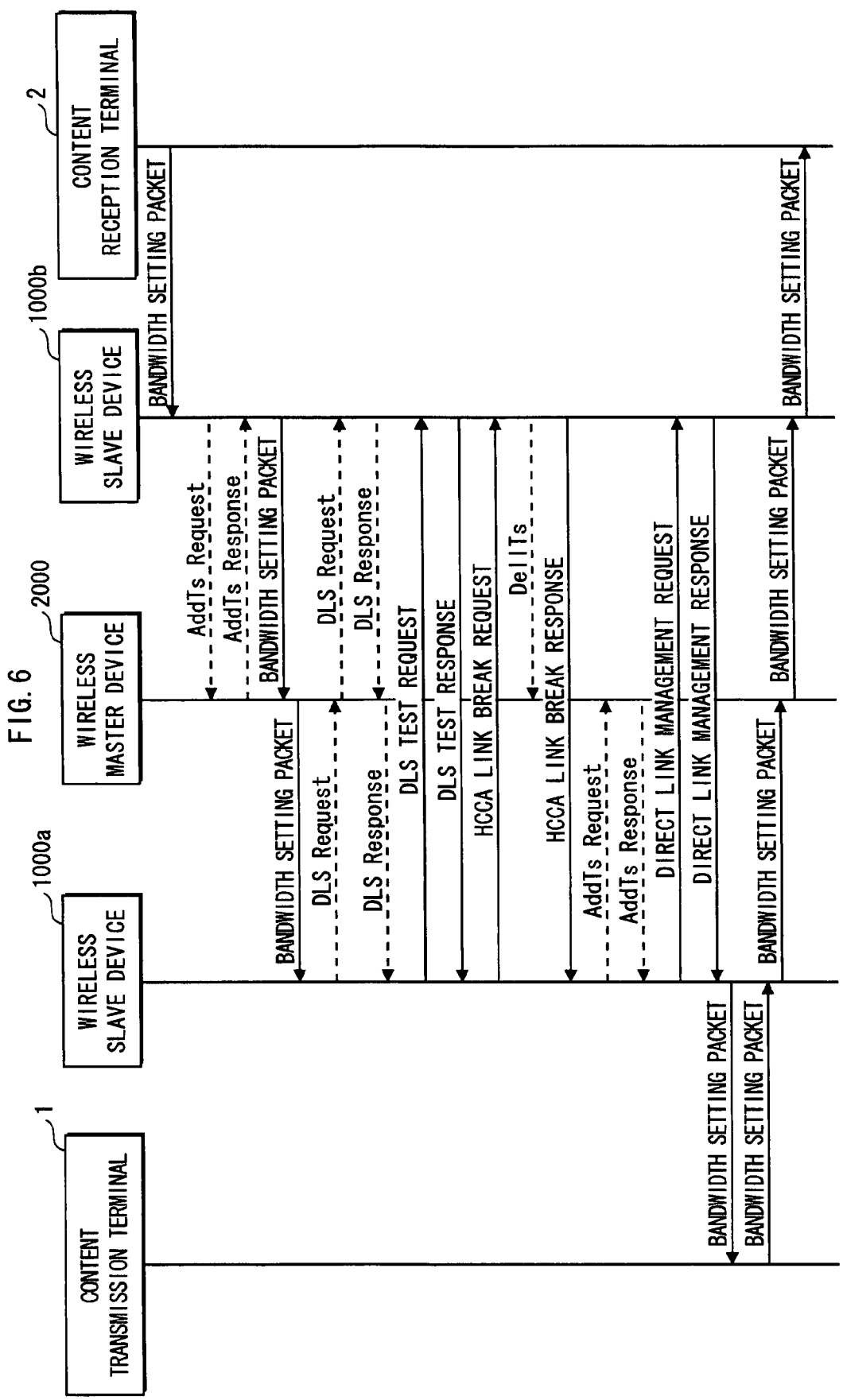
FIG. 6 shows details of communication performed by the wireless slave device 1000a and the wireless slave device 100b when the content reception terminal 2 transmits a bandwidth setting packet to the content transmission terminal 1.

FIG. 6 shows details of communication between the wireless slave devices 1000a and 1000b when the content reception terminal 2 transmits a bandwidth setting packet to the content transmission terminal 1.

As shown in FIG. 6, the wireless slave device 1000b receives the bandwidth setting packet from the content reception terminal 2a and determines whether device information is attached to the received bandwidth setting packet. Given that device information is not attached, the wireless slave device 1000b sets up a Down Link and transmits an AddTs Request to the wireless master device in order to ensure the bandwidth requested by the bandwidth setting packet. Upon setting up an HCCA connection and ensuring the requested bandwidth, the wireless slave device 1000b transmits the bandwidth setting packet to the wireless master device 2000.

The wireless master device 2000 receives the bandwidth setting packet from the wireless slave device 1000b, and transmits the received bandwidth setting packet to the wireless slave device 1000a.

The wireless slave device 1000a receives the bandwidth setting packet from the wireless master device 2000, and determines whether device information is attached to the received bandwidth setting packet.

Given that device information has been attached by the wireless slave device 1000b, the wireless slave device 1000a transmits a DLS Request to the wireless slave device 1000b via the wireless master device 2000.

Upon receiving the DLS Request, the wireless slave device 1000b transmits a DLS Response to the wireless slave device 1000a via the wireless master device 2000. Here, it is assumed that the wireless slave device 1000b is compatible with direct communication.

Upon receiving the DLS Response, the wireless slave device 1000a transmits a DLS test request directly to the wireless slave device 1000b without passing through the wireless master device 2000. Upon receiving the DLS test request, the wireless slave device 1000b transmits a DLS test response to the wireless slave device 1000a. Here, it is assumed that direct communication between the wireless slave devices 1000a and 1000b is possible.

Upon receiving the DLS test response, the wireless slave device 1000a causes the HCCA link change/break transmission subunit 175a to transmit, directly to the wireless slave device 1000b, an HCCA link break request for causing the wireless slave device 1000b to break the HCCA link established with the wireless master device.

Note that the HCCA link break request is output by the packet identification unit 103b of the wireless slave device 1000b to the bandwidth setting unit 107b, and analyzed by the HCCA link change/break reception subunit 172b. The bandwidth setting control subunit 177b receives the HCCA link break request, and thereafter the 11e MAC frame transmission subunit 176b transmits a DelTs to the wireless master device 2000 to break the HCCA connection established with the wireless master device 2000.

Upon the HCCA connection being broken, the bandwidth setting control subunit 177b causes the HCCA link change/break transmission subunit 175b to directly transmit, to the wireless slave device 1000a, an HCCA link break response indicating that the HCCA connection has been broken.

The HCCA link change/break reception subunit 172a of the wireless slave device 1000a receives the HCCA link break response, and thereafter the wireless slave device 1000a sets up a Direct Link and transmits an AddTs Request to the wireless master device 2000. Upon receiving an AddTs response from the wireless master device 2000, the wireless slave device 1000a directly transmits a Direct Link management request to the wireless slave device 1000b in order to cause the wireless slave device 1000b to manage information indicating that direct communication has been established between the wireless slave devices 1000a and 1000b.

The wireless slave device 1000b receives the Direct Link management request, creates a Direct Link management response to the received Direct Link management request, and transmits the created Direct Link management response to the wireless slave device 1000a. This enables both the wireless slave device 1000a and 1000b to manage information indicating that they are in direct communication with the other wireless slave device.

Upon managing information indicating that direct communication has been established, the wireless slave device 1000a transmits the bandwidth setting packet to the content transmission terminal 1 via the wired network.

Variation 2

The present invention also includes a case in which the content transmission terminal 1 and the content reception terminal 2 respectively include the wireless slave device 1000a and the wireless slave device 1000b.

The inclusion of the wireless slave devices in the terminals refers to a case in which, for example, a wireless LAN function has been implemented in the terminals.

Figure 7:
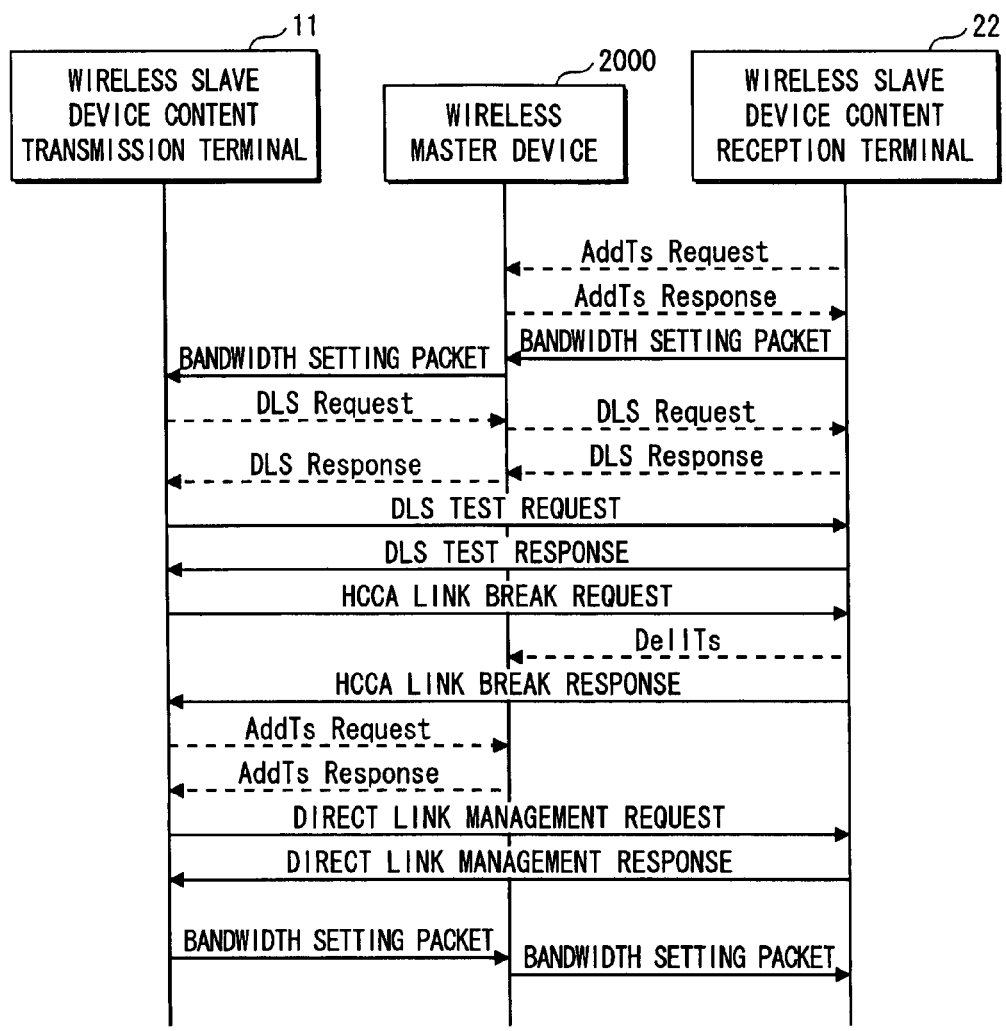
FIG. 7 shows details of communication performed by terminals in a case in which the terminals include a wireless slave device.

FIG. 7 shows details of, communication performed by terminals in a case in which they include wireless slave devices. FIG. 7 shows an exemplary case in which a wireless slave device content reception terminal 22 that includes a wireless slave device establishes direct communication with a wireless slave device content transmission terminal 11 that also includes a wireless slave device. Note that a description of details of the operations performed has been omitted since the operations are substantially the same as in the case described in variation 1, with the exception that there is no processing for exchanging bandwidth setting packets between the terminals and wireless slave devices.

The present invention also includes a case in which either the content transmission terminal or the content reception terminal includes a wireless slave device, and the other does not include a wireless slave device.

Note that the aforementioned wireless slave device-included content transmission terminal and the wireless slave device-included content reception terminal are, for example, a TV and DVD recorder that both include a wireless LAN function. The inclusion of wireless slave devices in the terminals enables data to be exchanged without constructing a wired network, which facilitates installation of the devices.

Supplementary Remarks

Although a relay device pertaining to the present invention has been described based on the embodiment, the following variations can also be implemented, and the present invention is of course not limited to the relay device described in the above embodiment.

(1) Although embodiment 1 has been described using an example of a wireless communication system that performs QoS control in accordance with the HCCA control scheme of the IEEE 802.11e standard, the present invention is not limited to this. Specifically, there is no need to perform QoS control. Also, the present invention can be applied to any wireless communication system that includes a wireless master device and wireless slave devices, and in which communication is performed via the wireless master device and directly between the wireless slave devices.

Also, the present invention can be applied to a wireless communication system such as an ad-hoc network that does not include a wireless master device that manages the wireless slave devices, and in which communication between wireless devices is relayed by another wireless device. For example, applying the present invention to this case enables the communication relayed via the other wireless device to be switched to direct communication between wireless devices.

(2) In the embodiment, a DLS Request, a DLS Response etc. are exchanged between wireless slave devices in accordance with the IEEE 802.11e standard in order to establish direct communication therebetween, and this case assumes that the IEEE 802.11e standard is used. However, the method of establishing direct communication between wireless devices is not limited to a method defined in the IEEE 802.11e standard. For example, direct communication between wireless devices can be established by a method in which a wireless device, which has acquired device information, transmits a packet bound for the address indicated the device information, and checks for a response to the transmitted packet.

(3) Although a case in which direct communication is established between the wireless slave devices when bandwidth setting packets are exchanged in order to set bandwidth before data is transmitted between the terminals is described in the above embodiment, the direct communication is not limited to being established when the bandwidth setting packets are exchanged. For example, direct communication may be established when stream data or the like is exchanged between the terminals.

Note that in this case, data transfer by direct communication and data transfer via a wireless master device may both be used. For example, the data transfer method may be controlled according to the type of data to be transmitted. Specifically, stream data that requires real-time performance may be exchanged between wireless slave devices by direct communication, and control information related to the stream data as well as other data unrelated to the stream data may be exchanged via a wireless master device.

Furthermore, data transfer by direct communication and data transfer via a wireless master device may be used separately according to changes in the bandwidth condition. For example, if the direct communication bandwidth degrades, the direct communication may be broken off and changed to communication via a wireless master device. Control for such data transfer methods can be realized by a method such as changing the data transfer method and amount of bandwidth to be ensured, if errors occur in a wireless slave device and data is retransmitted, and furthermore the number of retransmission exceeds a predetermined number.

Also, the amount of bandwidth set for direct communication etc. may be controlled according to the type of data to be transmitted.

(4) Although a wired network in which bandwidth is not ensured is described as existing between the terminals and the respective wireless slave devices in the above embodiment, the present invention is not limited to this. If a wired network that requires bandwidth to be ensured, such as high-speed power line communication (PLC), exists between the terminals and the respective wireless slave devices, bandwidth may be ensured when necessary, based on a bandwidth setting packet transmitted from a terminal.

(5) Although the information attached by a wireless slave device is described in the above embodiment based on the device information 302 shown in FIG. 3B, the present invention is not limited to this. Other substitutable parameters may be used as long as direct communication can be established between the wireless slave devices.

(6) Although the device information 302 is attached to the bandwidth setting packet by a wireless slave device in the above embodiment, the present invention is not limited to this. A terminal may transmit a bandwidth setting packet to a wireless slave device after attaching information pertaining to the wireless slave device to the bandwidth setting packet. Also, although the device information 302 is attached to the bandwidth setting packet in the above embodiment, the bandwidth setting packet may be provided with a redundant field in which the wireless slave device records the device information 302. Also, if a wireless slave device receives, from another wireless slave device, a bandwidth setting packet that already has device information attached thereto, the wireless slave device may erase the attached device information and attach device information pertaining to itself before transmitting the bandwidth setting packet to a wireless master device.

(7) The above devices may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes in order for the computer program to achieve predetermined functions.

(8) A portion or all of the constituent elements of the above devices may be structured as a single system LSI (Large Scale Integration). A system LSI is a super multi functional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program.

(9) A portion or all of the constituent elements of the above devices may be structured as a removable IC card or standalone module. The IC card or the module is a computer system including a microprocessor, a ROM, and a RAM. The IC card and the module may include the above super multi-functional LSI. The IC card and the module achieve their functions as the microprocessor operates in accordance with the computer program. This IC card or module may be tamper resistant.

(10) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be a computer system including a microprocessor and a memory, whereby the memory stores the computer programs, and the microprocessor operates in accordance with the computer programs.

Also, the present invention may be carried out by another independent computer system by transferring the programs or the digital signals which have been recorded on the recording media, or by transferring the programs or the digital signals via the network, etc.

(11) The present invention may be any combination of the above embodiment and variations.

INDUSTRIAL APPLICABILITY

The present invention is useful in, for example, a case in which devices exchange AV data etc. on a wireless home network in which a wireless control station compliant with the IEEE 802.11e standard is used as a wireless bridge to connect networks.

The invention claimed is:

1. A relay device that controls wireless communication of data in accordance with polling control performed by a wireless control station, receives transfer data from a transfer-source terminal via relaying by another relay device, and transfers the received transfer data to a transfer-destination terminal, the relay device comprising:
a communication unit configured to perform communication of a frame with the wireless control station, the frame including the transfer data received from the transfer-source terminal via relaying by the another relay device and the wireless control station;
a detection unit configured to detect identification information indicating an address of the another relay device, the identification information being attached, by the another relay device, to a payload of the frame along with the transfer data, and being used for communication performed in a data link layer; and
a control unit configured to, when the detection unit detects the identification information, control the communication unit to establish direct communication with the another relay device identified by the identification information,
wherein the control unit includes a processor, and
wherein the communication unit, after the establishment of the direct communication with the another relay device, transfers data to the another relay device by utilizing the established direct communication with the another relay device, rather than communicating with the another relay device by transferring data to the another relay device via the relaying by the wireless control station and in accordance with the polling control performed by the wireless control station.

2. The relay device of claim 1, further comprising:
an attachment unit configured to attach device information identifying the relay device to the transfer data, which is to be transferred to the wireless control station; and
a transfer unit configured to transfer the transfer data with the attached device information to the wireless control station.

3. The relay device of claim 1,
wherein the wireless control station and the relay device perform QoS control in accordance with an IEEE 802.11e standard, and wherein the communication unit establishes the direct communication using a Direct Link Setup defined in the IEEE 802.11e standard.

4. The relay device of claim 1,
wherein the transfer data transferred by the relay device is a bandwidth setting packet that is transmitted and received in order for the transfer-source terminal and the transfer-destination terminal to ensure a bandwidth, and
wherein the bandwidth for the direct communication with the another relay device is set according to the bandwidth setting packet.

5. The relay device of claim 4, wherein the bandwidth setting packet is a packet in accordance with a protocol defined by a UPnP AV standard.

6. A communication system comprising:
a first relay device; and
a second relay device,
wherein each of the first relay device and the second relay device controls wireless communication of data in accordance with polling control performed by a wireless control station,
wherein each of the first relay device and the second relay device receives transfer data from a transfer-source terminal via relaying by another relay device and transfers the received transfer data to a transfer-destination terminal,
wherein the first relay device comprises:
an attachment unit configured to attach device information identifying the first relay device to the transfer data, which is to be transferred to the wireless control station; and
a transfer unit configured to transfer the transfer data with the attached device information to the wireless control station,
wherein the second relay device comprises:
a communication unit configured to perform communication of a frame with the wireless control station, the frame including the transfer data received from the transfer-source terminal via relaying by the another relay device and the wireless control station;
a detection unit configured to detect identification information indicating an address of the another relay device, the identification information being attached, by the another relay device, to a payload of the frame along with the transfer data, and being used for communication performed in a data link layer; and
a control unit configured to, when the detection unit detects the identification information, control the communication unit to establish direct communication with the another relay device identified by the identification information,
wherein the control unit includes a processor, and
wherein the communication unit, after the establishment of the direct communication with the another relay device, transfers data to the another relay device by utilizing the established direct communication with the another relay device, rather than communicating with the another relay device by transferring data to the another relay device via the relaying by the wireless control station and in accordance with the polling control performed by the wireless control station.

7. A communication control method used in a relay device that controls wireless communication of data in accordance with polling control performed by a wireless control station, receives transfer data from a transfer-source terminal via relaying by another relay device, and transfers the received transfer data to a transfer-destination terminal, the communication control method comprising:
a step for performing, via a communication unit, communication of a frame with the wireless control station, the frame including the transfer data received from the transfer-source terminal via relaying by the another relay device and the wireless control station;
a step for detecting, via a detection unit, identification information indicating an address of the another relay device, the identification information being attached, by the another relay device, to a payload of the frame along with the transfer data, and being used for communication performed in a data link layer; and
a step for, when the step for detecting detects the identification information, causing, via a control unit including a processor, an establishment of direct communication with the another relay device identified by the identification information,
wherein, after the step for causing the establishment of the direct communication establishes the direct communication with the another relay device, the step for causing the establishment of the direct communication transfers data to the another relay device by utilizing the established direct communication with the another relay device, rather than communicating with the another relay device by transferring data to the another relay device via the relaying by the wireless control station and in accordance with the polling control performed by the wireless control station.

8. An integrated circuit used in a relay device that controls wireless communication of data in accordance with polling control performed by a wireless control station, receives transfer data from a transfer-source terminal via relaying by another relay device, and transfers the received transfer data to a transfer-destination terminal, the integrated circuit comprising:
a communication unit configured to perform communication of a frame with the wireless control station, the frame including the transfer data received from the transfer-source terminal via relaying by the another relay device and the wireless control station;
a detection unit configured to detect identification information indicating an address of the another relay device, the identification information being attached, by the another relay device, to a payload of the frame along with the transfer data, and being used for communication performed in a data link layer; and
a control unit configured to, when the detection unit detects the identification information, control the communication unit to establish direct communication with the another relay device identified by the identification information,
wherein the communication unit, after the establishment of the direct communication with the another relay device, transfers data to the another relay device by utilizing the established direct communication with the another relay device, rather than communicating with the another relay device by transferring data to the another relay device via the relaying by the wireless control station and in accordance with the polling control performed by the wireless control station.

9. A non-transitory computer-readable recording medium having a communication control program recorded thereon, the communication control program for being used in a relay device that controls wireless communication of data in accordance with polling control performed by a wireless control station, receives transfer data from a transfer-source terminal via relaying by another relay device, and transfers the received transfer data to a transfer-destination terminal, the communication control program causing a computer to execute a method comprising:

a step for performing, via a communication unit, communication of a frame with the wireless control station, the frame including the transfer data received from the transfer-source terminal via relaying by the another relay device and the wireless control station;

a step for detecting, via a detection unit, identification information indicating an address of the another relay device, the identification information being attached, by the another relay device, to a payload of the frame along with the transfer data, and being used for communication performed in a data link layer; and a step for, when the step for detecting detects the identification information, causing, via a control unit including a processor, an establishment of direct communication with the another relay device identified by the identification information, wherein, after the step for causing the establishment of the direct communication establishes the direct communication with the another relay device, the step for causing the establishment of the direct communication transfers data to the another relay device by utilizing the established direct communication with the another relay device, rather than communicating with the another relay device by transferring data to the another relay device via the relaying by the wireless control station and in accordance with the polling control performed by the wireless control station.

* * * * *